United States Patent
Pfitzer et al.

(10) Patent No.: US 7,862,717 B2
(45) Date of Patent: Jan. 4, 2011

(54) OIL FILTER ARRANGEMENT

(75) Inventors: Friedhelm Pfitzer, Rangendingen (DE); Alexander Maute, Hechingen-Stetten (DE); Peter Jungmann, Bisingen (DE)

(73) Assignee: Joma-Polytec Kunststofftechnik GmbH, Bodelshausen (DE)

( * ) Notice: Subject to any disclaimer, the term of this patent is extended or adjusted under 35 U.S.C. 154(b) by 373 days.

(21) Appl. No.: 11/990,986

(22) PCT Filed: May 18, 2006

(86) PCT No.: PCT/EP2006/004716

§ 371 (c)(1), (2), (4) Date: Feb. 26, 2008

(87) PCT Pub. No.: WO2007/028426

PCT Pub. Date: Mar. 15, 2007

(65) Prior Publication Data

US 2009/0139923 A1   Jun. 4, 2009

(30) Foreign Application Priority Data

Sep. 2, 2005   (DE) ................... 10 2005 042 714

(51) Int. Cl.
- *B01D 35/30* (2006.01)
- *B01D 29/88* (2006.01)
- *B01D 35/00* (2006.01)
- *B01D 27/00* (2006.01)

(52) U.S. Cl. .............. 210/234; 210/232; 210/248; 210/441; 210/428

(58) Field of Classification Search ........... 210/234, 210/232, 441, 248, 428
See application file for complete search history.

(56) References Cited

U.S. PATENT DOCUMENTS

| 5,516,425 | A | * | 5/1996 | Brieden et al. | ............ 210/232 |
| 6,746,604 | B2 | * | 6/2004 | Jainek | ................ 210/248 |
| 2005/0150825 | A1 | | 7/2005 | Clausen | |
| 2007/0144958 | A1 | * | 6/2007 | Gilles et al. | .............. 210/424 |

FOREIGN PATENT DOCUMENTS

| DE | 87 14 656 | 2/1988 |
| DE | 39 03 675 | 8/1990 |
| DE | 44 30 341 | 3/1995 |
| DE | 199 17 567 | 11/2000 |
| DE | 102 35 902 | 2/2004 |
| EP | 0 773 054 | 5/1997 |

* cited by examiner

Primary Examiner—Krishnan S Menon
Assistant Examiner—Benjamin Kurtz
(74) Attorney, Agent, or Firm—Paul Vincent

(57) ABSTRACT

An oil filter arrangement comprises a housing, which has a receiving chamber for a filter element which can be cross-flowed in a radial manner by oil and which can be inserted into the housing, a support tube which supports the filter element when it is inserted, a housing cover which closes the receiving chamber, and a drainage channel which is provided in the base area of the receiving chamber. The support tube is fixed to the housing and it remains therein when the filter element is replaced and that a drainage plate, which comprises closing means for closing the drainage channel and which is arranged in an axially displaceable manner, to a limited extent, on the support tube, is arranged in the base area of the receiving chamber.

19 Claims, 3 Drawing Sheets

OIL FILTER ARRANGEMENT

This application is the national stage of PCT/EP2006/004716 filed on May 18, 2006 and also claims Paris Convention priority to DE 10 2005 042 714.6, filed Sep. 2, 2005.

BACKGROUND OF THE INVENTION

The invention concerns an oil filter arrangement comprising a housing, which has a receiving chamber for a filter element that can be inserted into the housing and through which oil can flow in a radial direction, a support tube that supports the filter element when the filter element is inserted, a housing lid that closes the receiving chamber, and a drainage channel provided in the bottom area of the receiving chamber. The provision of a drainage channel is advantageous in that the oil in the receiving chamber can be discharged prior to complete removal of the filter element. This facilitates both handling of the filter element and exchange of the filter element.

There is a plurality of oil filter arrangements of this type.

DE 39 03 675 C2 discloses e.g. an oil filter arrangement, wherein a closing plug is provided on the side of the filter element facing the bottom area of the receiving chamber for closing the drainage channel.

In DE 102 35 902 A1, a purified oil opening that is surrounded by a pipe socket is disposed on the bottom of the receiving chamber. A drainage opening is moreover provided on the bottom, which can be closed via a closure part provided on a spring clip. When the filter element is inserted, the closure part is moved into the closed position via the spring clip. When the filter element is removed, the drainage channel is opened due to the inherent tension of the spring clip.

It is the underlying purpose of the present invention to further develop the disclosed prior art. In particular, the functional and operational safety of the oil filter arrangement shall be increased.

SUMMARY OF THE INVENTION

Towards this end, in accordance with the invention, the support tube is mounted to the housing and remains in the housing when the filter element is exchanged, and a drainage plate with a closing means for closing the drainage channel is disposed in the bottom area of the receiving chamber, which is disposed on the support tube such that it can be axially displaced at least to a certain degree.

Due to provision of the drainage plate, the drainage channel can be opened when the filter element is removed, such that the oil present in the receiving chamber can be discharged prior to complete removal of the filter element. The drainage plate including closing means may be made from a comparatively inflexible material, thereby providing large forces for closing the drainage plate. In prior art according to DE 102 35 902 A1, the closing force depends on the elasticity of the spring clip, since the spring clip is loaded by the filter element for closing the outlet channel.

In accordance with the invention, the can-shaped support tube may remain in the housing when the filter element is changed, which facilitates handling. Moreover, secure arrangement of the support tube is ensured, wherein the filter element can be pushed onto the support tube or be removed from the support tube. When the filter element is exchanged, the lid is removed and only the filter element is removed. When the support tube remains in the housing, it may, in particular, be locked, screwed and/or fastened like a bayonet and/or in an undetachable fashion to the housing. For locking, corresponding locking means must be provided. For screwing, corresponding threads and/or screws must be provided. For bayonet-like fastening, the support tube is initially introduced along its longitudinal axis into the receiving space and then fixed by turning it about is longitudinal axis by means of undercut sections that must be correspondingly provided.

In accordance with the invention, at least one pressure spring is advantageously disposed between the drainage plate and the bottom in such a fashion that, in the operating position when the housing is closed and the filter element is inserted, the drainage plate is loaded by the filter element against the spring force, and the closing means closes the drainage channel. In addition to the drainage plate which is displaceably disposed on the support tube, a pressure spring is consequently provided which loads the drainage plate. Since the pressure element is disposed between the bottom of the receiving chamber and the drainage plate, it is not absolutely necessary for the pressure spring to be directly supported on the bottom and/or the drainage plate. It may also be supported on the components on the housing side and/or on the drainage plate side.

In another advantageous fashion in accordance with the invention, the pressure spring urges the drainage plate from the operating position into a lowering position, in which the drainage channel is opened, during opening of the housing lid. The pressure spring is thereby advantageously designed such that the drainage plate including filter element are lifted when the housing lid is opened. The drainage channel is thereby automatically opened and the filter element is lifted due to the corresponding high spring force of the pressure spring. This substantially facilitates removal of the filter element from the receiving chamber. The filter element may thereby e.g. slightly project past the receiving chamber and is consequently easier to remove.

The drainage plate may thereby advantageously be formed like a ring disc, having a central opening in which the support tube is disposed. The plane of the drainage plate thereby advantageously extends at least largely perpendicularly to the central longitudinal axis of the support tube.

The drainage plate is thereby advantageously displaced parallel to the bottom of the receiving chamber or perpendicularly to the central longitudinal axis of the support tube, thereby achieving reliable insertion or closure of the drainage opening by the closing means. Jamming of the drainage plate on the support tube is moreover eliminated.

In total, the drainage plate may have a circular, oval, egg-shaped or any other contour.

The drainage plate may also have webs for support and/or guidance on the bottom of the receiving chamber and/or on the support tube and/or on the filter element. This can yield defined loading of the drainage plate by the filter element and/or defined guidance of the movement of the drainage plate. Webs may be provided on the bottom as defined stops for the drainage plate relative to the housing.

For guiding the drainage plate on the pipe socket, axially extending longitudinal groove sections may e.g. be provided on the support tube, wherein the drainage plate then comprises projections that project in a radial inward direction and engage in the longitudinal grooves. For limiting the motion range of the drainage plate in an axial upward direction, the longitudinal groove sections may have only a correspondingly defined length. The projections abut the ends of the longitudinal groove sections, thereby limiting the motion range of the drainage plate.

In accordance with a further advantageous embodiment of the invention, the support tube comprises feet that project in a radial outward direction, or a collar that is circumferential at least in sections and projects in a radial outward direction. The feet and/or the collar are thereby advantageously provided on the side of the support tube facing the bottom.

The support tube is thereby advantageously mounted to the housing via the feet or the collar. The feet or the collar of the support tube can, in particular, be locked, screwed, riveted and/or permanently fastened in a different fashion to the housing.

In accordance with a further advantageous embodiment of the invention, the pressure spring that acts against the drainage plate may be supported on the feet or the collar. Also in this embodiment, the pressure spring is disposed between the drainage plate and the bottom. In this embodiment, the geometry of the bottom 20 may advantageously be designed independently of the pressure spring, since the pressure spring is not supported on the bottom but on the feet or the collar.

The closing means as such may be designed, in particular, eccentrically with respect to the central longitudinal axis of the support tube on the drainage plate and project in an axial direction towards the drainage plate. The closing means may thereby be formed on the drainage plate as a closing plug. The closing means may also be provided as a sealant ring on the drainage plate, which is circumferential at least in sections about the central longitudinal axis. It is also feasible to accumulate sealant on the drainage plate only on the side facing the bottom, which closes the drainage channel in the operating position.

The closing means may advantageously have a web section that extends in the axial direction, and a closing section for closing the drainage channel. The web section is thereby used to bridge the space between the drainage plate and the drainage channel. The closing section that is used for closing the drainage channel may comprise a corresponding sealing.

Should the support tube have a collar that projects radially outwardly and downwardly, the collar may have a recess in the area disposed axially above the drainage channel, through which the closing means penetrate.

This can ensure that the closing means reaches the drainage channel despite the provision of a collar on the support tube.

The recess in the collar may thereby advantageously comprise a first partial section, wherein the cross-sectional surface of this partial section is larger than the cross-sectional surface of the closing section, such that the closing section can be inserted in an axial direction into this partial section. When the oil filter arrangement is mounted, the closing section can consequently be axially inserted into the first partial section of the recess.

In accordance with a further development of the invention, the recess has a second partial section such that, after axis-parallel displacement of the web section from the first partial section to the second partial section, its cross-sectional surface is smaller than the cross-sectional surface of the closing section to prevent axial removal of the closing means from the recess.

For mounting the oil filter arrangement, the drainage plate including closing means can consequently be turned about its longitudinal axis, such that the web section is moved from the first partial section of the recess to the second partial section of the recess. Since the second partial section of the recess is smaller than the cross-sectional surface of the closing means, axial removal of the closing means from the recess is no longer possible. This limits the motion range of the drainage plate in an axial upward direction in the final mounting position. The drainage plate is thereby consequently secured in the axial direction.

In order to preferably largely prevent jamming of the web section in the recess, the oil filter arrangement may comprise a spring element that surrounds the web section, which is supported on the drainage plate and also on the collar of the support tube. Together with the pressure spring, it ensures functionally reliable movement of the drainage plate when the filter element is removed.

In another advantageous embodiment of the invention, the support tube surrounds a pressure tube in the area of the bottom of the receiving chamber, which is closed in the radial direction and is radially spaced apart from the support tube. When the support tube is inserted, it may e.g. be disposed onto the pressure tube. The pressure tube then additionally serves as a joining aid.

In accordance with a further development of the invention, an overpressure bypass valve may be disposed on the free side of the support tube facing away from the bottom of the receiving chamber. A valve of this type opens when a limit pressure is exceeded, e.g. when a filter element clogs due to soiling.

Further details and advantageous embodiments of the invention can be extracted from the following description which describes and explains the invention in more detail with reference to the embodiments of the invention shown in the drawing.

DESCRIPTION OF THE PREFERRED EMBODIMENT

Figure 1:
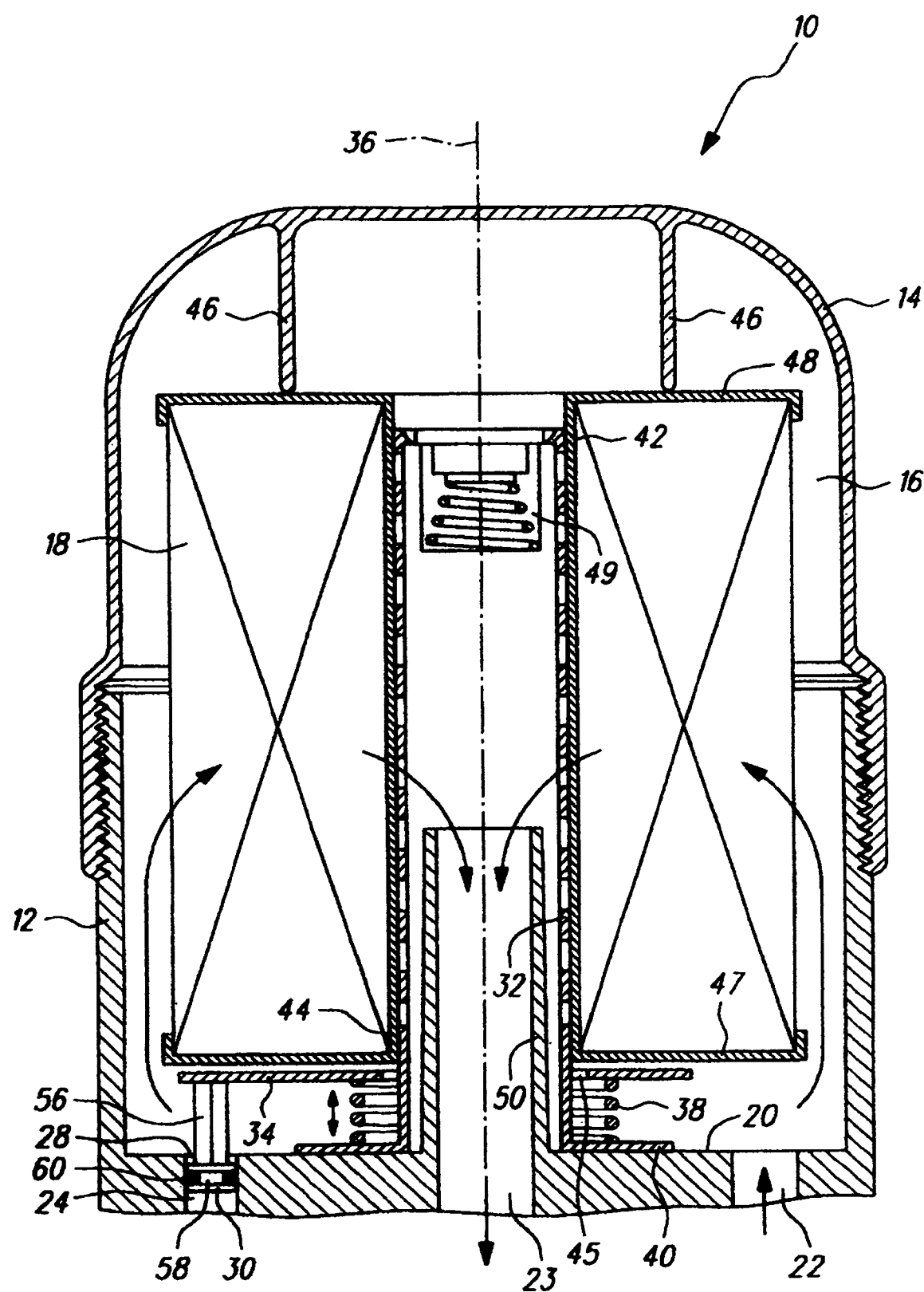
FIG. 1 shows a longitudinal section through a first embodiment of an inventive oil filter arrangement.

The oil filter arrangement 10 of FIG. 1 has a housing 12 and a housing lid 14 that can be disposed onto the housing 12 and can be screwed onto the housing 12 via a thread 15. The housing 12 has a receiving chamber 16 that contains a filter element 18 through which a radial flow can pass from the outside to the inside.

A crude oil opening 22 is provided on the bottom 20 of the receiving chamber 16 through which crude oil to be filtered flows into the receiving chamber 16. A drainage channel 24 is moreover provided on the bottom 20, via which the oil present in the receiving chamber 16 can be discharged when the housing lid 14 is opened or the filter element 18 is removed. The drainage channel 24 has a drainage opening 28. A purified oil channel 23 is moreover provided via which filtered oil can be discharged.

In the operating position of the filter arrangement 10 (FIG. 1) with closed lid and inserted filter element 18, the drainage opening 28 is closed by a closing means 30.

The plug-like closing means 30 itself is disposed on a drainage plate 34 which can be axially displaced on a support tube 32 in the bottom area 20 of the receiving chamber 16. In the operating position, the filter element 18 is disposed onto the frame-like support tube 32. In its upper radially inner area 42, the filter element 18 tightly abuts the upper end of the support tube 32 facing the lid 14. The radially inner area 44 of the filter element facing the bottom 12 correspondingly tightly abuts the support tube 32. The drainage plate 34 has a central opening 45 via which it is disposed onto the support tube 32. The drainage plate can thereby be displaced in the direction of the central longitudinal axis 36 of the filter arrangement. The plug-like closing means 30 thereby engages in the drainage opening 28, wherein the drainage channel 24 extends parallel to the central longitudinal axis 36 in the area of the drainage opening 28. This ensures that the drainage channel 24 can be reliably closed independently of the engagement depth of the closing means 30 in the drainage channel 24.

The drainage plate 34 is subjected to pressure by a pressure spring 38 in an upward direction towards the housing lid 14. The pressure spring 38 is supported on the drainage plate 34 and also on a collar 40 of the support tube 32, which is mounted to the bottom 20 and faces in a radial outward direction.

The support tube 32 is thereby mounted to the housing 12 in such a fashion that it remains in the housing 12 when the filter element 18 is exchanged. The support tube 32 may e.g. be locked, screwed, riveted and/or welded to the housing 12.

Due to the spring load of the drainage plate 34, the drainage plate is moved in an axial upward direction when the housing lid 14 is removed, whereby the closing means 30 releases the drainage opening 28 and the oil in the receiving chamber 16 can be discharged via the drainage channel 24. The pressure spring 38 is thereby designed such that when the housing lid 14 is removed, the drainage plate 34 is lifted and the filter element 18 is also moved in an axial upward direction. This facilitates removal of the filter element 18 from the receiving chamber 16.

In order to load the lower end side 47 of the filter element 18 against the spring force of the pressure spring 38 in the operating position, ribs 46 are provided on the lid 14, which act against the upper end side 48 of the filter element 18. A bypass valve 49 is provided at the free end of the support tube 32, which opens due to pressure increase when the filter element 18 is highly soiled or clogged.

In the area of the bottom 20, the support tube 32 surrounds a pressure tube 50 that forms the purified oil channel 23 and is radially spaced apart from the support tube.

The embodiment of the invention shown in FIGS. 2 through 5 substantially corresponds to the arrangement of FIG. 1. The components of FIGS. 2 through 5 that correspond to those of FIG. 1 are designated with corresponding reference numerals.

The support tube 32 also has a radially outwardly projecting collar 40 via which the support tube 32 is permanently mounted to the housing 12. As is clearly shown in FIG. 3, the support tube may be mounted to the housing 12 via screws 52. Towards this end, corresponding mounting pins 41 may be provided on the housing 12 and/or on the support tube 21. The support tube 32 may correspondingly be undetachably fastened to the housing 12 e.g. through hot riveting in the area of the collar 40.

The drainage plate 34 has openings 54 above the screws 52 so that the screw head of the screw 50 can be reached axially from the top.

Figure 2:
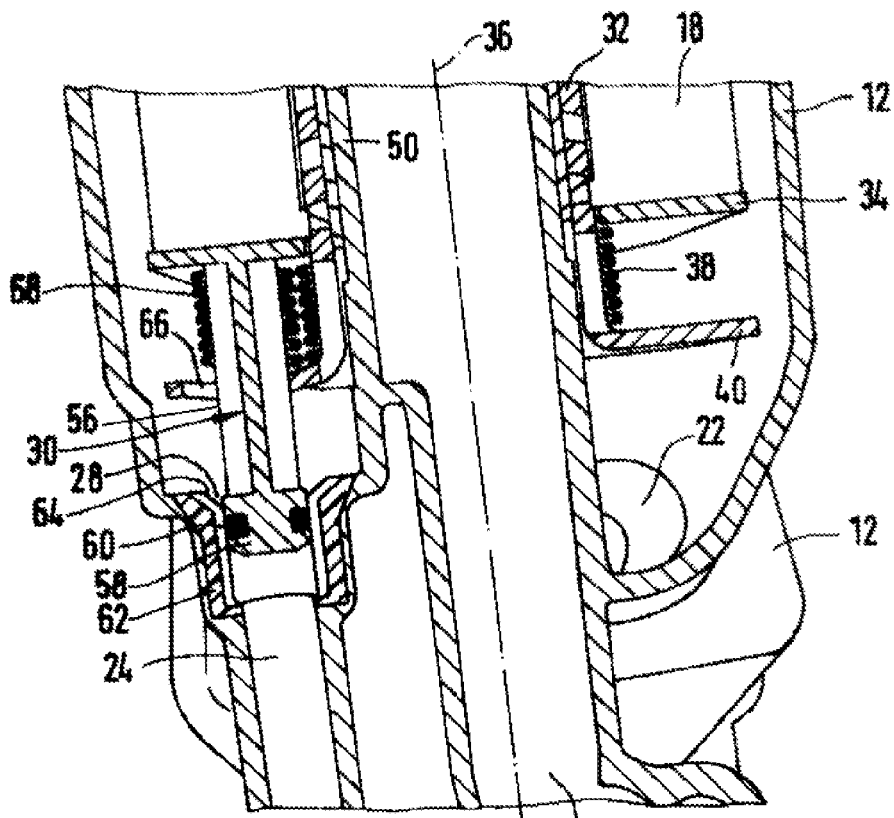
FIG. 2 shows a longitudinal section through the bottom area of a receiving chamber of a second embodiment of the invention.
Figure 3:
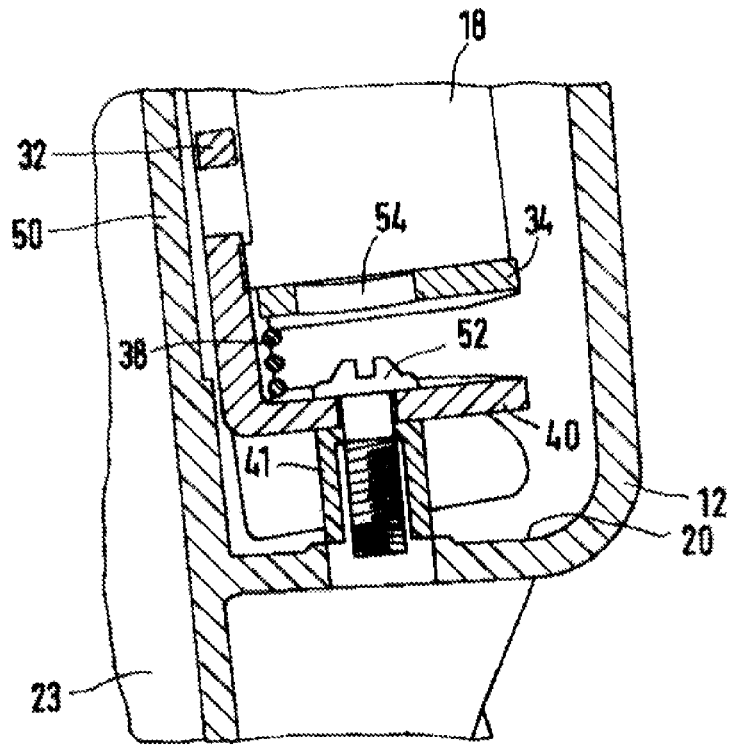
FIG. 3 shows a detailed view of FIG. 2.

The sectional view of FIG. 2 is selected such that the closing means 30 is clearly visible. The closing means 30 that extends eccentrically to the central longitudinal axis 36 comprises a web section 56 that extends in an axial direction, and a closing section 58 for closing the drainage channel 24. The closing section 58 moreover comprises a sealant in the form of a sealing ring 60. The closing section 58 thereby engages in the drainage channel 24 shown in the operating position in FIG. 2, wherein a sealing insert 62 is disposed on the housing 12 in the area of the drainage channel opening 28. On its side facing the inner chamber 16, the sleeve-like sealing insert 62 comprises insertion slopes 64 for the closing section 58.

FIG. 2 also clearly shows that the collar 40 of the support tube 32 has a recess 66 in the area axially above the drainage opening 28, through which the closing means 30 or the web section 56 projects. A spring element 68 is disposed around the web section 56, which is supported on the drainage plate 34 and also on the area of the collar 40 surrounding the recess 66. When the lid 14 is opened in the embodiment of FIG. 2, the drainage plate 34 is consequently lifted due to the pressure spring 38 and due to the spring element 68.

Figure 4:
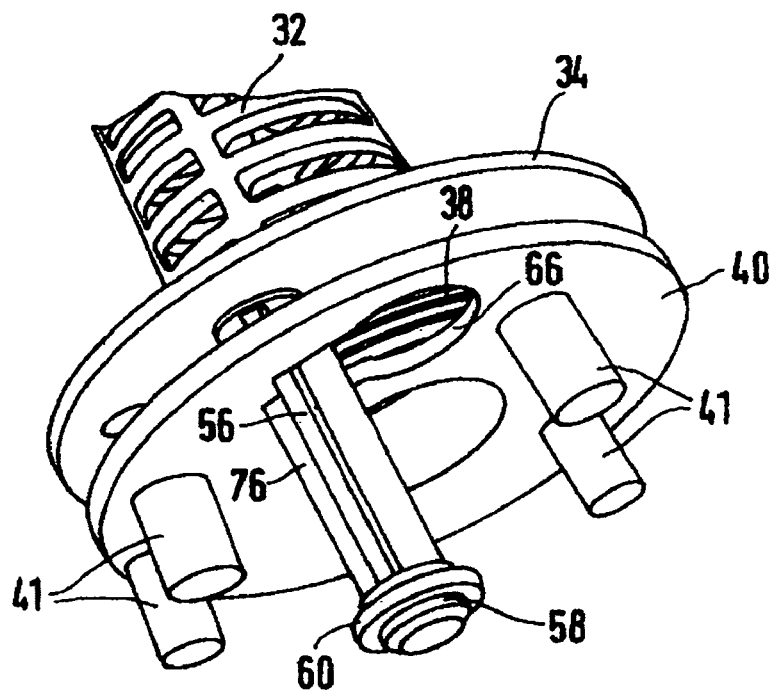
FIG. 4 shows the support tube including collar and drainage plate in accordance with the embodiment of FIGS. 2 and 3.
Figure 5:
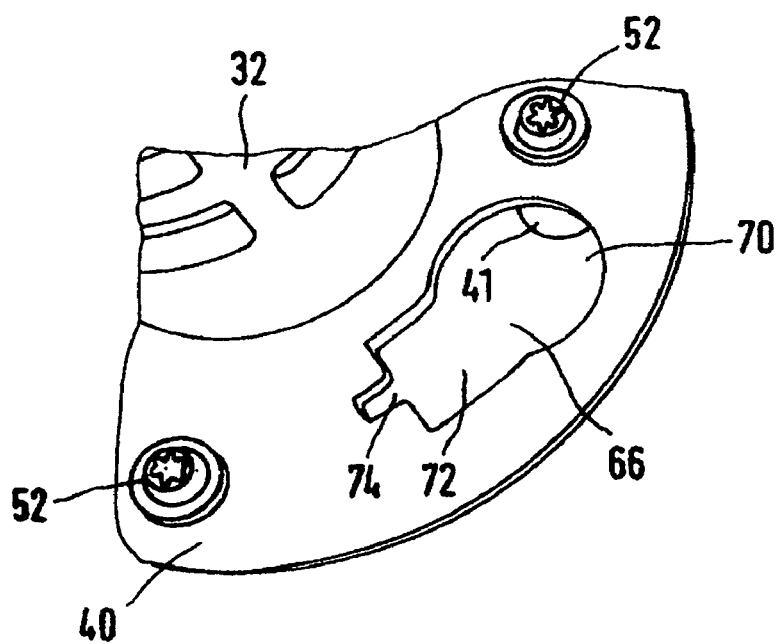
FIG. 5 shows a top view of the collar of the support tube in accordance with FIG. 4.

FIGS. 4 and 5 clearly show that the recess 66 has two partial sections 70 and 72.

The first partial section 70 thereby has a circular diameter whose surface is slightly larger than the cross-sectional surface of the closing section 58. The closing section 58 may thereby be inserted in an axial direction into the partial section 70 of the recess 66.

FIGS. 2 and 4 clearly show that the web section 56 has a cross-section with a cross rib-like contour. FIG. 5 clearly shows that the second partial section 72 has a cross contour 74 on its side facing away from the partial section 70, which is complementary to the cross rib contour of the web section 56.

The web section 56 may be moved from the partial section 70 in a pre-assembly position to the partial section 72 into a final assembly position. The rib 76 of the web section 56 facing away from the partial section 70 is then moved to the cross contour 74 of the partial section 72. This limits the axial motion of the drainage plate 34. For this reason, the drainage plate 34 can be disposed on the support tube 32 in a non-detachable fashion, wherein the support tube 32, the drainage plate 34 and the springs 38 and 68 form a pre-assembly group that can be separately handled. This pre-assembly group can be inserted into the receiving chamber 16 during production of the oil filter arrangement 10. The support tube 32 can then be finally fixed in the housing 12 using screws 52 or in another fashion.

We claim:

1. An oil filter arrangement for a filter element, the oil filter arrangement comprising:
   a housing defining a receiving chamber for the filter element, said receiving chamber having a drainage channel disposed in a bottom area thereof, said housing structured to support radial flow of oil through the filter element;
   a support tube that supports the filter element when the filter element is inserted and which remains in said housing when the filter element is exchanged;
   a housing lid that closes said receiving chamber; and
   a drainage plate, said drainage plate being separately formed and distinct from the filter element and from said support tube, said drainage plate disposed on said support tube in said bottom area of said receiving chamber such that it can be axially displaced, at least to a limited degree, said drainage plate having means for closing said drainage channel, said support tube comprising feet or a collar that project in a radial outward direction, said collar being circumferential at least in sections wherein a pressure spring is supported on said feet or collar.

2. The oil filter arrangement of claim 1, wherein said support tube is mounted to said housing.

3. The oil filter arrangement of claim 1, wherein at least one pressure spring is disposed between said drainage plate and said bottom area in such a fashion that the filter element loads said drainage plate against a spring force in an operating position with closed housing and inserted filter element, wherein said for closing closes said drainage channel.

4. The oil filter arrangement of claim 3, wherein, when said housing lid is opened, said drainage plate is pressed by said pressure spring from an operating position into a lowering position in which said drainage channel is open.

5. The oil filter arrangement of claim 1, wherein said drainage plate is designed like a ring disc.

6. The oil filter arrangement of claim 1, wherein said support tube is mounted to said housing via said feet or collar.

7. An oil filter arrangement for a filter element, the oil filter arrangement comprising:
   a housing defining a receiving chamber for the filter element, said receiving chamber having a drainage channel disposed in a bottom area thereof, said housing structured to support radial flow of oil through the filter element;
   a support tube that supports the filter element when the filter element is inserted and which remains in said housing when the filter element is exchanged;
   a housing lid that closes said receiving chamber; and
   a drainage plate, said drainage plate being separately formed and distinct from the filter element and from said support tube, said drainage plate disposed on said support tube in said bottom area of said receiving chamber such that it can be axially displaced, at least to a limited degree, said drainage plate having means for closing said drainage channel, wherein said support tube comprises feet or a collar that project in a radial outward direction, said collar being circumferential at least in section, said collar having a recess in an area located axially above said drainage channel, through which said means for closing penetrates.

8. The oil filter arrangement of claim 7, wherein said recess has a first partial section, a cross-sectional surface of said first partial section being larger than a cross-sectional surface of said closing section, wherein said means for closing can be axially inserted into said first partial section.

9. The oil filter arrangement of claim 8, wherein said recess has a second partial section whose cross-sectional surface is smaller than a cross-sectional surface of said closing section such that, after axis-parallel displacement of a web section from said first partial section to said second partial section, said means for closing cannot be removed from said recess in an axial direction.

10. The oil filter arrangement of claim 9, wherein said second partial section of said recess has a contour which is, at least in sections, complementary to a contour of a cross-section of said web section.

11. The oil filter arrangement of claim 9, wherein a spring element surrounds said web section and is supported on said drainage plate and also on said collar of said support tube.

12. The oil filter arrangement of claim 7, wherein said support tube is mounted to said housing.

13. The oil filter arrangement of claim 7, wherein at least one pressure spring is disposed between said drainage plate and said bottom area in such a fashion that the filter element loads said drainage plate against a spring force in an operating position with closed housing and inserted filter element, wherein said means for closing closes said drainage channel.

14. The oil filter arrangement of claim 7, wherein said drainage plate is designed like a ring disc.

15. The oil filter arrangement of claim 7, wherein said support tube is mounted to said housing via said feet or collar.

16. An oil filter arrangement for a filter element, the oil filter arrangement comprising:
   a housing defining a receiving chamber for the filter element, said receiving chamber having a drainage channel disposed in a bottom area thereof, said housing structured to support radial flow of oil through the filter element;
   a support tube that supports the filter element when the filter element is inserted and which remains in said housing when the filter element is exchanged;
   a housing lid that closes said receiving chamber; and
   a drainage plate, said drainage plate being separately formed and distinct from the filter element and from said support tube, said drainage plate disposed on said support tube in said bottom area of said receiving chamber such that it can be axially displaced, at least to a limited degree, said drainage plate having means for closing said drainage channel, wherein said means for closing is designed eccentrically with respect to a central longitudinal axis of said support tube and projects in an axial direction, said means for closing having a web section that extends in an axial direction, and a closing section for closing said drainage channel, wherein said support tube surrounds a pressure tube in the area of said bottom of said receiving chamber, said pressure tube being closed in a radial direction and radially spaced apart from said support tube.

17. The oil filter arrangement of claim 16, wherein said support tube is mounted to said housing.

18. The oil filter arrangement of claim 16, wherein at least one pressure spring is disposed between said drainage plate and said bottom area in such a fashion that the filter element loads said drainage plate against a spring force in an operating position with closed housing and inserted filter element, wherein said means for closing closes said drainage channel.

19. The oil filter arrangement of claim 16, wherein said drainage plate is designed like a ring disc.

* * * * *